Dec. 20, 1949     F. KAUPMANN     2,491,861
CIGAR LIGHTER
Filed Aug. 18, 1945
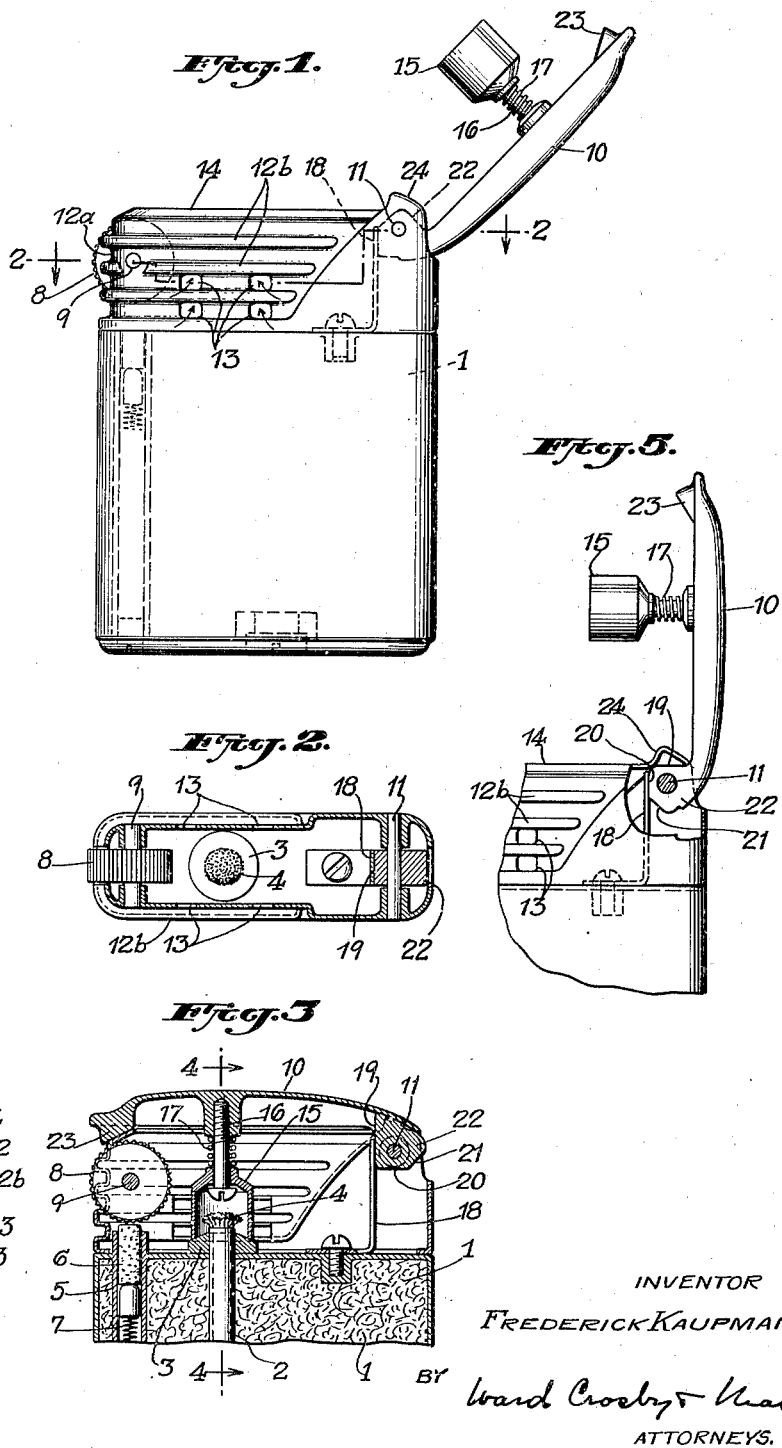
INVENTOR
FREDERICK KAUPMANN
BY Ward Crosby & Neal
ATTORNEYS.

Patented Dec. 20, 1949

2,491,861

UNITED STATES PATENT OFFICE 2,491,861

CIGAR LIGHTER

Frederick Kaupmann, Brooklyn, N. Y., assignor to Ronson Art Metal Works, Inc., Newark, N. J., a corporation of New Jersey Application August 18, 1945, Serial No. 611,348

3 Claims. (Cl. 67—7.1)

The invention relates to cigar lighters of the pyrophoric type and in one aspect aims to provide a flame shielding construction which will tend to reduce overheating and burning of the operator's fingers by contact with the shield. In another aspect the invention relates to special features of construction of the cover provided to overlie the operating parts when the lighter is not in use, and the cap provided to seal the wick, in such manner that the cover may be readily moved to and from convenient open positions appropriate for different uses, and an effective seal of the wick maintained when the cover is closed. Further objects and advantages of the invention will be in part obvious and in part specifically referred to in the description hereinafter contained which, taken in conjunction with the accompanying drawings, discloses a preferred form of lighter constructed to operate in accordance with the invention. In the drawings—

Fig. 1 is a side elevation of a lighter constructed in accordance with the invention, the cover thereof being shown in wide open position.

Fig. 2 is a section on the broken line 2—2 of Fig. 1.

Fig. 3 is a longitudinal vertical section of the upper part of the lighter.

Fig. 4 is a section on line 4—4 of Fig. 3.

Fig. 5 is a fragmentary view similar to Fig. 1 but showing the cover in an intermediate open position.

The invention is disclosed as applied to a lighter of the thumbwheel type having a fuel compartment 1 which may be understood as of usual character, having a wick tube 2 extending upwardly through the top wall of the casing to provide a snuffer seat 3 for the upper end 4 of the wick, and a sparking metal tube 5 containing the flint 6 which is pressed by spring 7 into engagement with the sparking wheel 8, which latter is of the thumbwheel type, and mounted upon a cross spindle 9.

The exposed end 4 of the wick is flanked by a windshield construction which also serves as a seat for the cover 10 of the lighter, which cover is pivoted about the cross stud 11. As will be noted from Figs. 1 to 4 this windshield construction includes sidewalls 12 which are of corrugated cross section so as to provide inner flutes 12a which are the parts of the shield most exposed to the heat of the flame, and outer flutes 12b which are exposed to the operator's hand and relatively remote from the flame. Thus the exposed portions of the windshield are less likely to burn the operator's hand by contact therewith, and the large heat radiating area obtained by this type of construction also aids in dissipating the heat of the flame, due both to the corrugated form and the large size of the windshield, which substantially surrounds the entire space above fuel casing 1. The side walls of the windshield are provided with air admitting openings 13, and the top of the windshield forms seat portions 14 against which the cover 10 engages when closed.

To seal the wick 4, a snuffer cap 15 is provided which is yieldably connected to the cover 10, and spring pressed so that it may accommodate itself to the seat 3 and be tightly pressed against the latter when the cover is closed. As shown in Fig. 3, the snuffer cap 15 is slidably carried by a screw 16 extending downwardly from cover 10, and a spring 17 urges the snuffer cap downwardly as the parts appear in Fig. 3. When the cover 10 is closed as shown in Fig. 3, the snuffer cap 15 engages the seat 3 somewhat before the cover 10 engages the seat portions 14 of the windshield construction, and the pressure of spring 17 holds the cap 15 tightly in sealing position.

The cover 10 is arranged to be held releasably in the wide open position shown in Fig. 1, or alternatively in an intermediate open position shown in Fig. 5. As shown, a flat spring 18 presses yieldingly against one or the other of the flat faces 19, 20 and 21 of a hub 22 which is provided on the cover 10 and through which the stud 11 passes. This construction enables cover 10 to be swung wide open as shown in Fig. 1, as may be desired to position the lighter well out of the way when it is being used for lighting a pipe, or alternatively the cover may be readily placed and releasably held in the intermediate open position shown in Fig. 5, which is preferred if a cigarette is being lighted. The cover may be provided with a lip 23 which closely overlies the sparking wheel 8 when the cover is closed, and lugs 24 (Fig. 5) may be provided on the casing to fill in the spaces on the opposite sides of the hub 22 when cover 10 is closed.

While the invention has been disclosed as carried out by a cigar lighter of the above described specific construction it should be understood that changes may be made therein without departing from the invention in its broader aspects, within the scope of the appended claims.

I claim:

1. A lighter of the pyrophoric type having a fuel casing, a sparking wheel mounted above the fuel casing adjacent one edge thereof, a wick tube extending through said casing adjacent said sparking wheel, and a windshield flanking said wick tube and sparking wheel, said windshield having side walls which are disposed on opposite sides of the wick tube, said side walls having a series of transverse corrugations disposed at different levels above the fuel casing and flanking the wick tube and sparking wheel on opposite sides thereof.

2. A lighter of the pyrophoric type having a fuel casing, a sparking wheel mounted above the fuel casing adjacent one edge thereof, a wick tube extending through said casing adjacent said sparking wheel, a windshield flanking said wick tube and sparking wheel, said windshield having side walls which are disposed on opposite sides of the wick tube, said side walls having series of transverse corrugations disposed at different levels above the fuel casing and flanking the wick tube and sparking wheel on opposite sides thereof, and a pivoted cover for the lighter seating upon the upper portions of said windshield side walls when in closed position.

3. A lighter of the pyrophoric type having a fuel casing, a sparking wheel mounted above the fuel casing adjacent one edge thereof, a wick tube extending through said casing adjacent said sparking wheel, a windshield flanking said wick tube and sparking wheel, said windshield having side walls which are disposed on opposite sides of the wick tube, said side walls having series of transverse corrugations disposed at different levels above the fuel casing and flanking the wick tube and sparking wheel on opposite sides thereof, and a pivoted cover for the lighter seating upon the upper portions of said windshield side walls when in closed position, said cover carrying a snuffer cap, and said cap being movably mounted with respect to said cover, and a spring yieldingly urging said snuffer cap toward wick sealing position.

FREDERICK KAUPMANN.

REFERENCES CITED

The following references are of record in the file of this patent:

UNITED STATES PATENTS

| Number | Name | Date |
| --- | --- | --- |
| 1,720,534 | Wilber | July 9, 1929 |
| 1,746,949 | Kollstede | Feb. 11, 1930 |
| 2,219,531 | Racek | Oct. 29, 1940 |
| 2,242,906 | Evans | May 20, 1941 |